(12) United States Patent
Johnsen et al.

(10) Patent No.: US 6,604,483 B1
(45) Date of Patent: Aug. 12, 2003

(54) STREAMER HANDLING APPARATUS FOR USE ON SEISMIC SURVEY VESSELS

(75) Inventors: Baard Johnsen, Lillesand (NO); Carel Willem Jan Hooykaas, Asker (NO)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/869,744

(22) PCT Filed: Jan. 12, 2000

(86) PCT No.: PCT/IB00/00033
§ 371 (c)(1),
(2), (4) Date: Sep. 10, 2001

(87) PCT Pub. No.: WO00/41926
PCT Pub. Date: Jul. 20, 2000

(30) Foreign Application Priority Data

Jan. 13, 1999 (GB) ............................................. 9900567

(51) Int. Cl.⁷ .............................................. B63B 21/66

(52) U.S. Cl. .................................. 114/244; 254/134.3 R
(58) Field of Search .................................. 114/242, 244, 114/245, 253, 254; 254/134.3 R, 134.3 SC

(56) References Cited

U.S. PATENT DOCUMENTS 5,284,323 A * 2/1994 Pawkett ............. 254/134.3 SC
5,488,920 A * 2/1996 Gjestrum .................... 114/244

* cited by examiner

Primary Examiner—Jesus D. Sotelo
(74) Attorney, Agent, or Firm—David S. Figatner

(57) ABSTRACT

Streamer handling apparatus for use on a seismic survey vessel (10) comprises one or more trolleys (40) movable along a guide rail (50) over the width of stern (18) and of the streamer deck (20) of the vessel. The or each trolley (40) is provided with a clamping device (70) which can be used to grip the inboard end of part of a multi-section streamer (28) deployed over the stern end of the streamer deck (20), so facilitating the transfer of parts of streamers from one streamer (28) station to another across the width of the streamer deck (20).

18 Claims, 5 Drawing Sheets

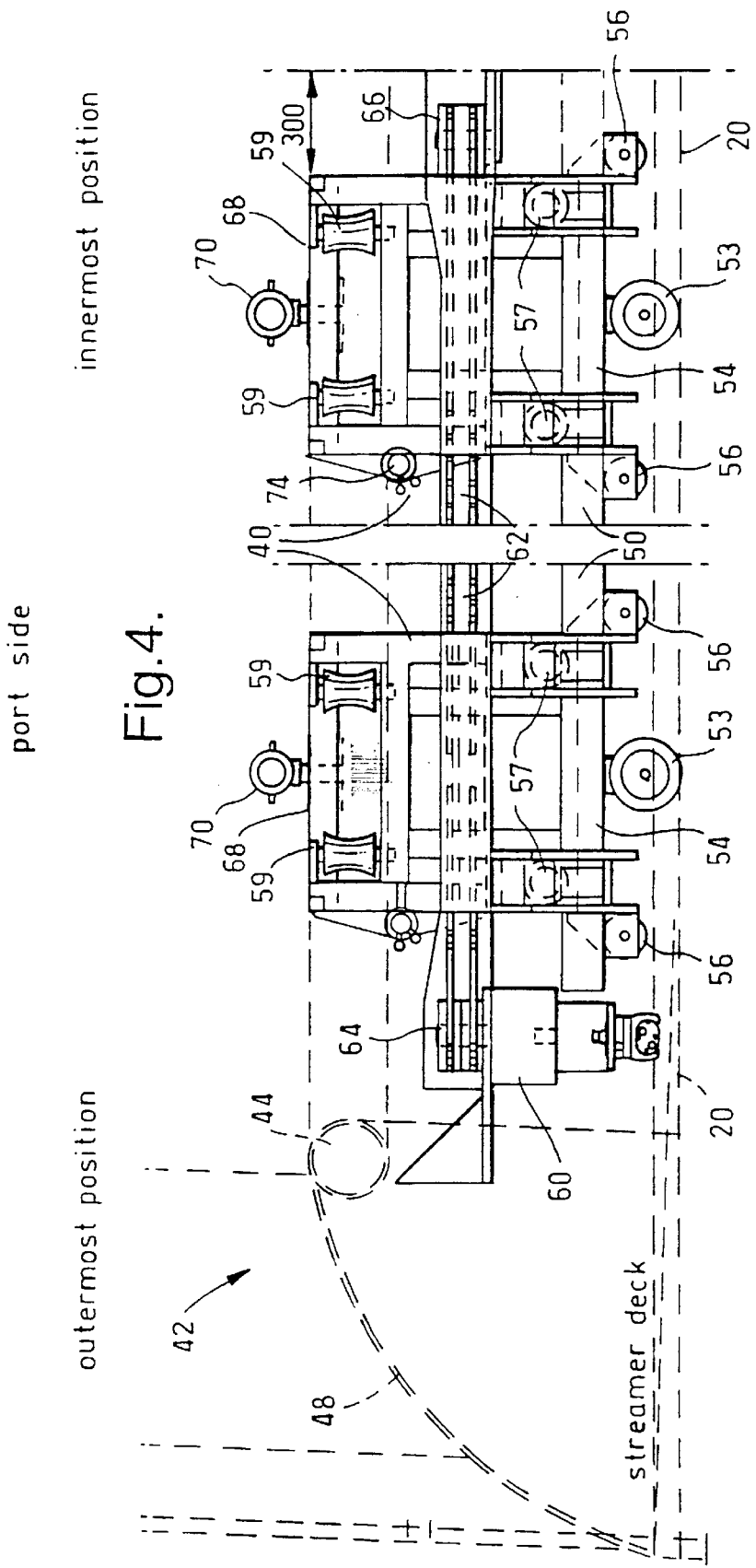

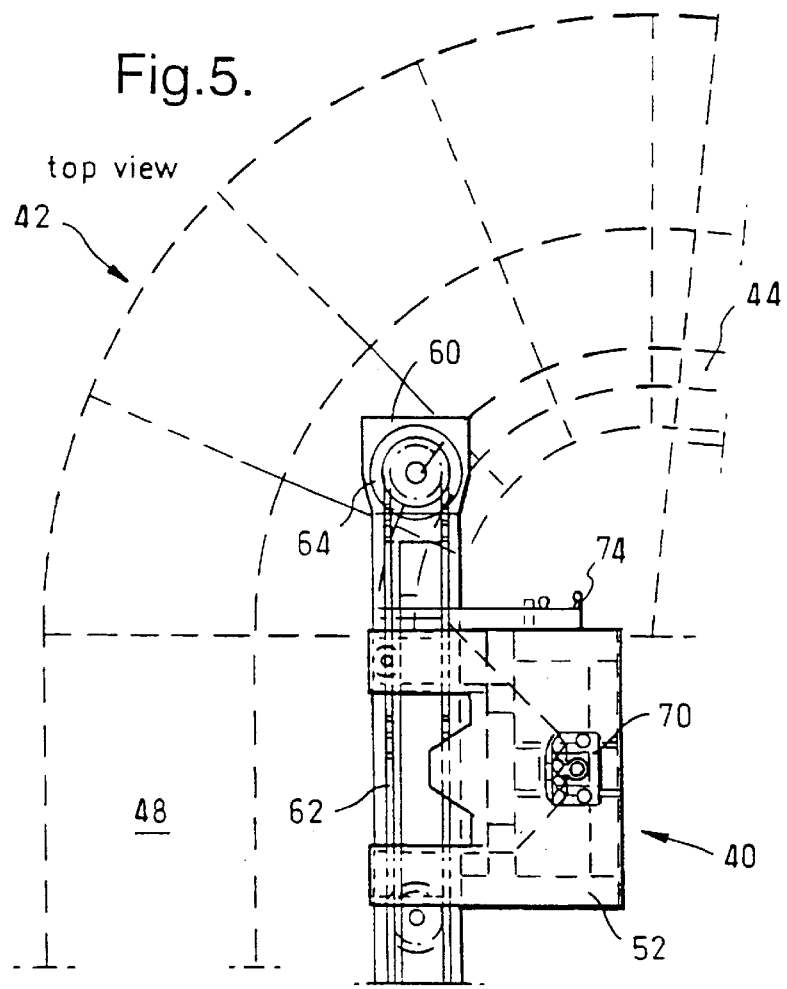
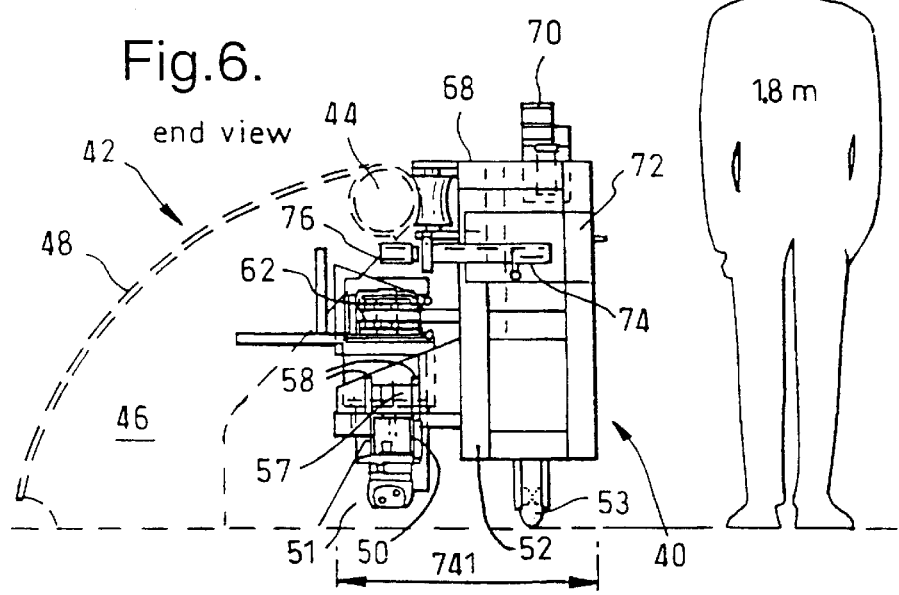

STREAMER HANDLING APPARATUS FOR USE ON SEISMIC SURVEY VESSELS

This invention relates to streamer handling apparatus for use on seismic survey vessels, and is more particularly concerned with such apparatus for use on seismic survey vessels of the kind used in performing 3D marine seismic surveys covering large areas.

In order to perform a 3D marine seismic survey, an array of marine seismic streamers, each typically several thousand meters long and containing a large number of hydrophones and associated electronic equipment distributed along its length, is towed at about 5 knots behind a seismic survey vessel, which also tows one or more seismic sources, typically air guns. Acoustic signals produced by the seismic sources are directed down through the water into the earth beneath, where they are reflected from the various strata. The reflected signals are received by the hydrophones in the streamers, digitised and then transmitted to the seismic survey vessel, where they are recorded and at least partially processed with the ultimate aim of building up a representation of the earth strata in the area being surveyed.

At the present time, a typical streamer array used by the Applicant comprises a 700 meter wide array of eight evenly spaced streamers, each about 4000 meters long. The streamers are towed by their lead-ins, ie the armoured electrical cables that convey electrical power, control and data signals between the vessel and the streamers, as described in the Applicant's U.S. Pat. No. 4,798,156, and their spread is controlled and maintained by MONOWING deflectors of the kind described in the Applicant's U.S. Pat. No. 5,357,892. Wider arrays containing even more streamers can be achieved using the technique of the Applicant's PCT Patent Application No. PCT/IB98/01435 (WO 99/15913).

From time to time, it may be desired to change the length of one or more of the streamers in an array while at sea. Since each streamer is normally made up from a large number of substantially identical 100 meter streamer sections connected together end to end, such a change is typically achieved by transferring sections from one streamer to another. This typically involves partially reeling in one streamer until only the sections to be transferred are still in the water, disconnecting those sections and connecting them to a derrick, and using the derrick to transfer the disconnected sections to a different streamer station. This procedure has the disadvantages of involving several crew members, and of being time consuming and inconvenient. It is therefore an object of the present invention to provide streamer handling apparatus which alleviates at least one of these disadvantages.

According to the present invention, there is provided streamer handling apparatus for use on a seismic survey vessel, the apparatus comprising guide means adapted to be mounted on the streamer deck of the vessel, adjacent the stern end of the streamer deck, so as to extend transversely over at least a part of the width of the streamer deck, and trolley means movable across the streamer deck, the trolley means being adapted to engage the guide means so as to be guided thereby in its movement across the streamer deck, and including a clamping device for gripping the inboard end of part of a streamer whose other end is deployed over the stern end of the streamer deck.

Thus when it is desired to transfer part of a first streamer to the end of a second streamer, to increase the length of the second streamer, and assuming that the second streamer is initially fully reeled in, the trolley means is positioned at the deployment station of the first streamer, and the first streamer is reeled in over the trolley means until the inboard end of the first streamer section of the part to be transferred reaches the trolley means. The inboard end of that section is then clamped in the clamping device, so that the trolley means and its clamping device take up the load of the part of the streamer to be transferred (which is still deployed over the stern of the streamer deck), and the remainder of the first streamer is disconnected from the part to be transferred. The trolley means, and the end of the streamer part clamped to it, are then moved laterally until they reach the deployment station of the second streamer, whereupon the end of the second streamer is connected to the end of the streamer part clamped to the trolley means. At this point, the clamping device is released, and the second streamer, now of increased length, can be fully deployed.

In a preferred embodiment of the invention, the apparatus comprises two such trolley means, each movable transversely over substantially the whole of a respective half (port or starboard) of the width of the streamer deck.

Advantageously, the guide means includes, for the or each trolley means, a respective guide rail adapted to be secured to but spaced above the streamer deck, and the or each trolley means includes at least one guide wheel which engages the underside of the guide rail, and preferably two such guide wheels which are spaced apart in the direction of movement of the trolley means.

Preferably the or each guide rail is disposed between its trolley means and the stern end of the streamer deck.

Typically, the stern end of the streamer deck is provided with a guard (or safety) rail extending its whole width at about waist height, in which case the or each trolley means may include at least one guide roller which engages the inboard side of the guard rail, and preferably two such guide rollers which are spaced apart in the direction of movement of the trolley means.

Conveniently, the or each trolley means is also provided with at least one support wheel which runs on the streamer deck.

Preferably, the or each trolley means is motor driven, for example by means of a respective hydraulic motor which is fixedly disposed at one end of the guide rail of the trolley means and which drives the trolley means via a chain connected to the trolley means.

Conveniently, the or each trolley means includes storage space, preferably in the form of at least one drawer, for storing tools and the like.

The invention also includes a seismic survey vessel incorporating streamer handling apparatus as defined in any of the preceding statements of invention.

The invention will now be described, by way of example only, with reference to the accompanying drawings, of which:

FIG. 4 is a side view of the streamer handling apparatus of the present invention; and FIGS. 5 and 6 are end and top views respectively of the apparatus of FIG. 4.

Figure 1:
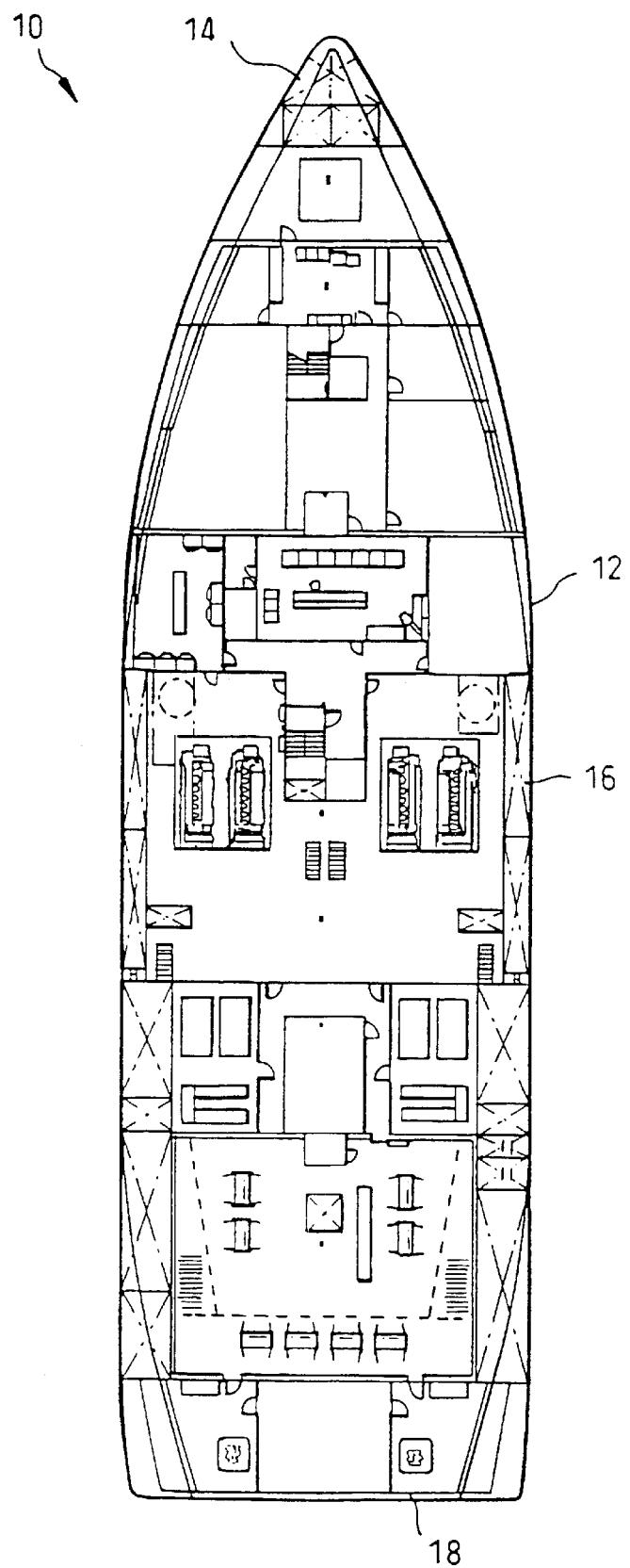
FIG. 1 is a plan view of a deep marine seismic survey vessel, substantially at the level of its waterline, the vessel incorporating streamer handling apparatus in accordance with the present invention.

The deep marine seismic survey vessel shown in the drawings is indicated generally at 10, and forms the subject of PCT Patent Application No. PCT/GB98/01832 (WO 99/00295). The vessel 10 has a displacement monohull 12 which is typically just over 80 meters long at the waterline (and just under 90 meters long overall), with a beam of about 24 meters. The maximum displacement of the vessel 10 is typically about 7500 tonnes.

As can be seen in FIG. 1, the shape of the hull 12 at the waterline is fairly conventional, in that the width of the hull increases smoothly and progressively from the bow 14 to a centre section 16 of substantially uniform width, and then progressively decreases, but to a much lesser extent, from the centre section to a wide cut-off stern 18. Below the waterline, the taper towards the stern 18 increases progressively with depth.

The vessel 10 has most if not all of the major features common to a vessel of its type and size, e.g. multiple diesel engines, bow thrusters, electric generators, accommodation for 60 to 70 persons, a helideck, winches, derricks, emergency equipment, etc. However, since these features can take any of several well known and conventional forms, and are not germane to the present invention, they will not be described in detail for the sake of simplicity.

Additionally, the vessel 10 is arranged in accordance with the invention for performing deep marine seismic surveys, as will now be described.

Figure 2:
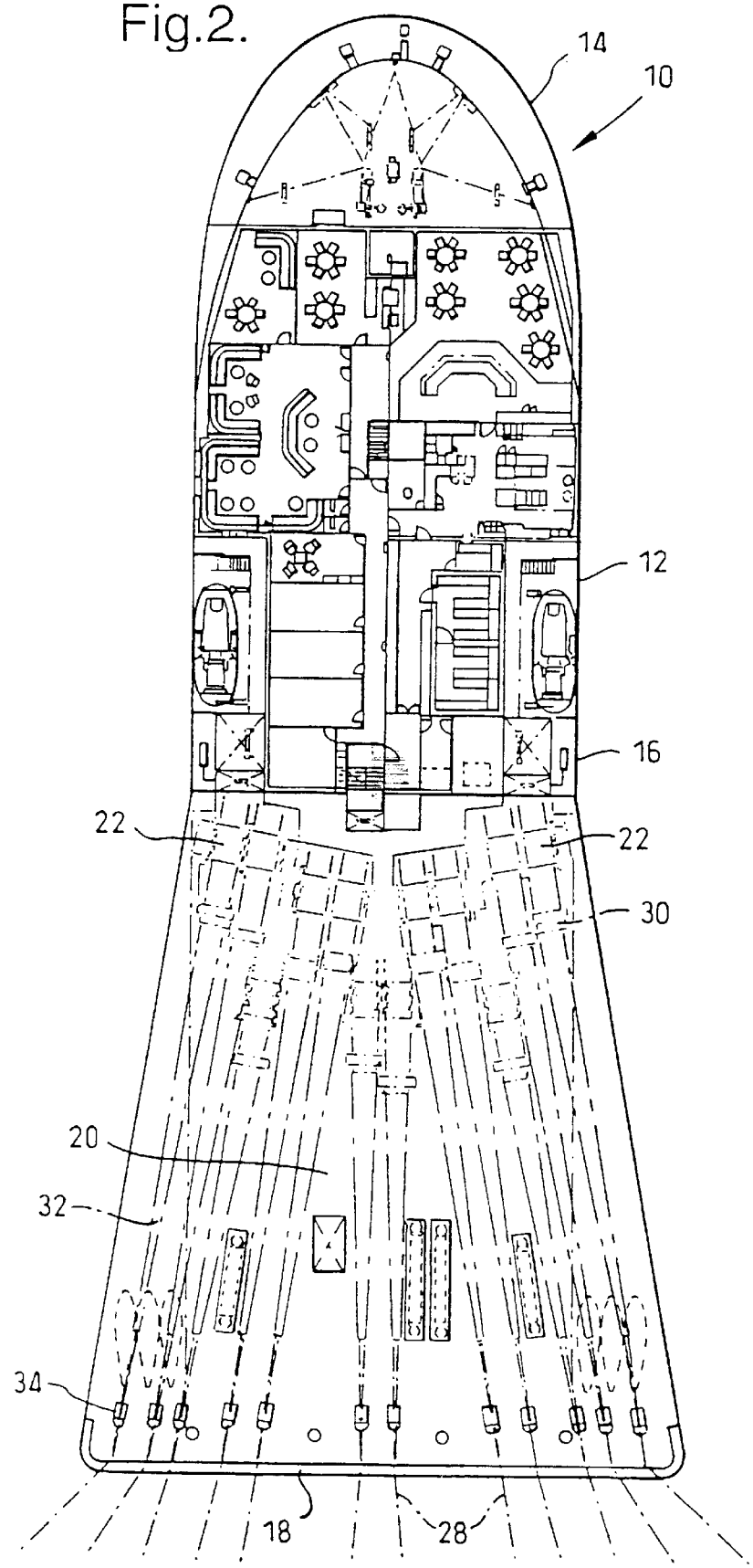
FIG. 2 is a plan view of the streamer deck of the vessel of FIG. 1.
Figure 3:
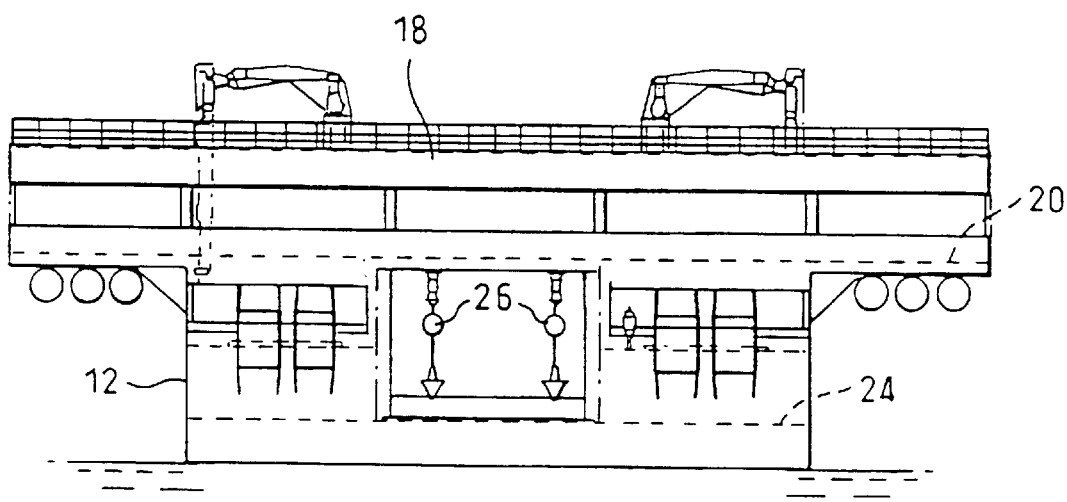
FIG. 3 is a stern view of the vessel of FIGS. 1 and 2.

Thus as can be seen in FIG. 2, the vessel 10 has a streamer deck 20 which extends aft from the centre section 16, increasing linearly in width as it does so from about 24 meters at the centre section to about 37.5 meters at the stern 18, the increase in width taking place symmetrically on each side of the fore-and-aft centre line of the vessel 10. The overall length of the streamer deck is about 36 meters, while the height of the streamer deck 20 above the waterline of the vessel 10 is typically about 9 meters.

Within the centre section 16 of the vessel 10, sixteen large powered streamer drums 22 are distributed across the width of the vessel, each drum having its axis extending substantially horizontally and transversely of the vessel 10 and being capable of storing a respective streamer up to 6000 meters long, together with its lead-in. The outer four drums 22 on each side of the centre line of the vessel 10 are mounted at least partly below the streamer deck 20, while the inner eight drums are mounted on the streamer deck itself, the drums being partly interleaved to fit them in the available space. The lower drums 22 overspool, while the upper ones underspool.

At the centre of the stern 18 of the vessel 10, beneath the streamer deck 20, is a deck 24 known as the gun deck. From the gun deck 24, seismic sources 26, typically multiple airgun seismic sources of the kind described in the Applicant's U.S. Pat. No. 4,686,660, are deployed, typically using a handling system of the kind described in the Applicant's U.S. Pat. No. 5,488,920.

In use, the streamers, indicated rather diagrammatically at 28, each pass over a respective guide 30 and then along the length of the streamer deck towards the stern 18 of the vessel 10. As they pass over the streamer deck 20, the streamers 28 pass via respective tension relieving devices 32, and at the stern 18 they each pass over a respective further guide, this time in the form of a spooling block 34. To save space, the spooling blocks 34 can be of the type described in the Applicant's PCT Patent Application No. PCT/IB97/00156 (WO 97/29302). Each spooling block 34 forms part of a respective streamer handling apparatus, by means of which the streamer 28 can be raised and lowered with respect to the streamer deck 20 as described in detail in the aforementioned PCT Patent Application No. PCT/GB98/01832.

Once deployed over the stern 18 of vessel 10, the sixteen streamers 28, towed at about 5 knots by the vessel, are formed into an array typically up to 1500 meters wide, using the Applicant's MONOWING deflectors and the technique of the Applicant's PCT Patent Application No. PCT/IB98/01435 as mentioned hereinbefore. This wide streamer array is then used, in conjunction with the seismic sources 26, to perform a 3D marine seismic survey as described earlier.

Each of the streamers 28 is made up of a large number of substantially identical streamer sections, typically each 100 meters long, which are releasably connected together end to end by electrical or electro-optical connectors. As already mentioned, it may sometimes be desired to change the length of one or more of the streamers 28 by transferring streamer sections from one streamer to another streamer while the streamers are being towed. This is achieved using the additional streamer handling apparatus of FIGS. 4 to 6.

Thus the additional streamer handling apparatus of FIGS. 4 to 6 is based upon two wheeled trolleys mounted on the streamer deck 20 of the vessel 10, and each movable transversely of the streamer deck across a respective half (port of starboard) of its width: one of these trolleys, the port one, is shown at 40 in FIGS. 4 to 6 at each end of range of transverse movement.

The streamer deck 20 is provided with an inwardly-leaning waist-high guard (or safety) rail 42, which extends across the whole of its stern edge and partly round the corners at the port and starboard ends of Its stern edge. The guard rail 42 comprises a continuous steel tube 44, which forms its inwardly leaning top and which is secured to the streamer deck 20 by spaced apart inwardly curved brackets (or stanchions) 46, and a curved fairing 48, which is secured to the outboard sides of the brackets 46 and which extends from the tube 44 down to the stern edge of the streamer deck to form a continuous smoothly curved surface on which the streamers 28 can rest while being handled. Two aligned guide rails or beams 50, one for each trolley 40, are secured to the streamer deck 20, beneath the guard rail 42, by brackets 51, in such a manner that they are spaced just above the streamer deck and extend substantially parallel to the guard rail 42. As will become apparent, the guide rails 50 each serve both to secure a respective one of the trolleys 40 to the streamer deck 20, and to guide the movement of the trolley across the streamer deck, while the guard rail 42 provides additional guidance to both trolleys.

Thus each of the trolleys 40 has a generally rectangular body 52 supported on the streamer deck 20 on a wheel 53 having a pneumatic tyre. The body 52 is provided adjacent the bottom of its stern side with a bracket 54 carrying two spaced apart guide wheels 56, which engage the underside of the respective guide rail 50. The stern side of the trolley 40 is also provided, above the bracket 54, with two further spaced apart guide wheels 57 which engage the top of the guide rail 50. The guide wheels 57 have axially spaced flanges 58 which embrace the top of the guide rail 50, so that the guide wheels 56, 57 together serve to secure the trolley 40 to the streamer deck 20. A pair of spaced apart concave guide rollers 59, mounted at the top of the stern side of the body 52, engage the inboard side of the tube 44 of the guard rail 42, so that the guard rail 42 and the guide rails 50 constrain the trolleys 40 to move transversely across the streamer deck 20.

Each trolley 40 is driven by a respective hydraulic motor 60, mounted on the streamer deck 20 at the outer end of the respective guide rail 50, via a respective double chain 62. The opposite ends of this double chain 62 are attached to its trolley 40, and the chain extends from the trolley to the respective motor 60, around respective drive cogs 64 driven by the motor, along the full length of the respective guide rail 50, round respective idler cogs 66 at the other end of the respective guide rail 50, and back to the trolley.

The upper surface 68 of the body 52 of each trolley 40 is at about waist height, so that the trolley effectively serves as a movable workbench, and is provided with a streamer clamp 70 which is adapted to encircle and grip the metal connector provided at the end of each 100 meter streamer section making up the streamers 28. The body 52 of each trolley 40 also includes a drawer 72 in which tools for working on the streamers 28 can be kept.

Each trolley 40 is provided on one side with a bolt or pawl 74 which can engage a respective horizontally extending pipe or tube 76 welded to the underside of the tube 44 of the guard rail 42, at right angles thereto, at each streamer station across the streamer deck 20, so that the trolley can be locked in position at each streamer station.

In use, when it is desired to transfer an end part of a first streamer to the end of a second streamer, in order to increase the length of the second streamer, and assuming the second streamer is already reeled in, the appropriate one of the trolleys 40 is moved across the streamer deck 20 and locked in position at the streamer station of the first streamer, beneath the streamer (since as described in the aforementioned PCT Patent Application No. PCT/GB98/01832, the spooling blocks 34 support the streamers well above the streamer deck 20 while the streamers are deployed for normal use). The first streamer is then reeled in over the trolley 40 until the inboard end of the part to be transferred approaches the trolley. The spooling block 34 is then lowered as described in PCT Patent Application No. PCT/GB98/101832, thus lowering the streamer, until the end connector of the streamer section defining the inboard end of the part of the first streamer to be transferred reaches the upper surface 68 of the trolley 40, and can be clamped in the streamer clamp 70. The trolley 40 and the clamp 70 now take up the load represented by the streamer part to be transferred, which part is partly resting on the curved fairing 48, but mostly still in the sea behind the vessel 10. The inboard part of the first streamer is then disconnected from the part to be transferred, and possibly reeled onto its drum 22.

Next, the trolley 40 is moved transversely of the streamer deck 20 and locked in position at the streamer station of the second streamer, whose end is connected to the end of the streamer part held in the clamp 70. Finally, the clamp 70 is released, the spooling block 34 is raised back to its normal height, and the second streamer, now of increased length, is fully deployed in the usual way.

The streamer handling apparatus based on the trolleys 40 is extremely simple and efficient in use, enabling one person to effect the transfer described above quickly, easily and safely.

Many modifications can be made to the described embodiment of the invention. For example, two trolleys 40 can be provided for each half of the streamer deck 22 (making four trolleys in total). But in the limit, a single trolley 40 movable over the whole width of the streamer deck can be used on smaller vessels. Additionally, the trolleys 40 can be driven by electric (rather than hydraulic) motors, and can take other forms and shapes capable of guided movement transversely of the stern end of the streamer deck.

What is claimed is:

1. Streamer handling apparatus for use on a seismic survey vessel, the apparatus comprising guide means adapted to be mounted on the streamer deck of the vessel, adjacent the stern end of the streamer deck, so as to extend transversely over at least a part of the width of the streamer deck, and trolley means movable across the streamer deck, the trolley means being adapted to engage the guide means so as to be guided thereby in its movement across the streamer deck, and including a clamping device for gripping the inboard end of part of a streamer whose other end is deployed over the stern end of the streamer deck.

2. Apparatus as claimed in claim 1, comprising two of said trolley means, each movable transversely over substantially the whole of a respective half (port or starboard) of the width of the streamer deck.

3. Apparatus as claimed in claim 1, wherein the guide means comprises, for the or each trolley means, a respective guide rail adapted to be secured to but spaced above the streamer deck, the or each trolley means including at least one guide wheel for engaging the underside of the guide rail.

4. Apparatus as claimed in claim 3, in which the or each trolley means includes two of said guide wheels, which are spaced apart in the direction of movement of the trolley means.

5. Apparatus as claimed in claim 3, in which the or each guide rail is disposed between its trolley means and the stern end of the streamer deck.

6. Apparatus as claimed in claim 1, for use where the stern end of the streamer deck is provided with a guard rail extending its whole width, in which the or each trolley means includes at least one guide roller which engages the inboard side of the guard rail.

7. Apparatus as claimed in claim 6, in which the or each trolley means includes two of said guide rollers, which are spaced apart in the direction of movement of the trolley means.

8. Apparatus as claimed in claim 1, in which the or each trolley means is provided with at least one support wheel which runs on the streamer deck.

9. Apparatus as claimed in claim 1, in which the or each trolley means is motor driven.

10. Apparatus as claimed in claim 1, in which the or each trolley means is motor driven by means of a respective hydraulic motor which is fixedly disposed at one end of the guide rail of the trolley means and which drives the trolley means via a chain connected to the trolley means.

11. Apparatus as claimed in claim 1, in which the or each trolley means includes storage means for storing tools and the like.

12. Apparatus as claimed in claim 11, wherein the storage means comprises at least one drawer.

13. A streamer handling apparatus for use on a seismic survey vessel, the apparatus comprising:

a guide rail mounted on a streamer deck of the vessel and extending transversely over at least a part of the width of the streamer deck;

a trolley comprising a guide wheel for engaging the guide rail to be guided thereby in its movement across the streamer deck, and a clamping device for gripping the inboard end of part of a streamer whose other end is deployed over the stern end of the streamer deck.

14. A method for streamer handling on a seismic survey vessel, the method comprising:

reeling in a first streamer over a trolley until an inboard end of the first streamer reaches the trolley;

clamping the inboard end of the first streamer to a clamping device;

disconnecting the clamped portion of the first streamer from the remaining portion of the first streamer;

moving the trolley and the clamped portion of the first streamer using a guide mounted on the vessel to a location of a second streamer; and connecting the clamped portion of the first streamer to an end of the second streamer.

15. The method as claimed in claim 14, additionally comprising releasing the clamping device.

16. The method as claimed in claim 14, additionally comprising deploying the connected portion of the first streamer and the second streamer.

17. The method as claimed in claim 14, wherein the guide comprises a guide rail adapted to be secured to but spaced above the streamer deck, the trolley comprising at least one guide wheel for engaging the underside of the guide rail.

18. The method as claimed in claim 14, wherein moving the trolley comprises driving the trolley with a motor.

* * * * *